(12) United States Patent
Chommeloux et al.

(10) Patent No.: US 9,405,949 B2
(45) Date of Patent: Aug. 2, 2016

(54) SYSTEM FOR INTERROGATING A REMOTELY INTERROGATABLE PASSIVE SENSOR INTEGRATED INTO A METAL CAVITY WITH REDUCED SYSTEM LOSS AND INTERROGATION METHOD

(71) Applicant: SENSEOR, Mougins (FR)

(72) Inventors: Luc Chommeloux, Le Cannet (FR);
Jean-Michel Friedt, Besancon (FR);
Christophe Droit, Besancon (FR);
Jeremy Masson, Avanne-Aveney (FR)

(73) Assignee: SENSEOR, Valbonne-Sophia Antipolis (FR)

( * ) Notice: Subject to any disclaimer, the term of this patent is extended or adjusted under 35 U.S.C. 154(b) by 265 days.

(21) Appl. No.: 14/265,191

(22) Filed: Apr. 29, 2014

(65) Prior Publication Data

US 2014/0320266 A1    Oct. 30, 2014

(51) Int. Cl.
*H04Q 5/22*     (2006.01)
*A61N 5/00*     (2006.01)
(Continued)

(52) U.S. Cl.
CPC .......... *G06K 7/10366* (2013.01); *G01K 11/265* (2013.01); *G01S 7/40* (2013.01); *G01S 13/75* (2013.01)

(58) Field of Classification Search
CPC ................................................. G06K 7/10366
USPC ........................................................ 340/10.1
See application file for complete search history.

(56) References Cited

U.S. PATENT DOCUMENTS 4,489,289 A * 12/1984 Slobodnik ............... H03L 1/026
                                                    310/313 A
5,793,305 A    8/1998 Turner et al.
(Continued)

FOREIGN PATENT DOCUMENTS

EP        0179591 A2    4/1986
EP        0598624 A1    5/1994

OTHER PUBLICATIONS

L. Reindl, et al., "Wireless Measurement of Temperature Using Surface Acoustic Waves Sensors", 2003 IEEE International Frequency Control Symposium and PDA Exhibition Jointly with the 17th European Frequency and Time Forum, May 4, 2003, pp. 935-941, IEEE, New York, NY, USA, XP010688919.
(Continued)

*Primary Examiner* — Jennifer Mehmood
*Assistant Examiner* — John Mortell
(74) *Attorney, Agent, or Firm* — Baker & Hostetler LLP

(57) ABSTRACT

A system comprises a cavity being reflecting for RF waves and comprises at least one acoustic wave sensor exhibiting a resonance frequency band, coupled to a sensor antenna; and an interrogation/reception device for the sensor. The interrogation/reception device comprises: means for transmitting/receiving an RF signal transmitting within an interrogation frequency band comprising the resonance frequency band of the sensor; at least a first transmission/reception antenna and a second transmission antenna/reception, positioned within the cavity; means for dividing the signal into at least a first RF signal and a second RF signal, the first signal being transmitted to the first transmission/reception antenna and the second signal being transmitted to the second transmission/reception antenna; means for creating a phase-shift between the first RF signal and the second RF signal; means for analysing the power level of the received signal. An interrogation method used in the system is also provided.

12 Claims, 3 Drawing Sheets

(51) Int. Cl.
*G21K 5/10* (2006.01)
*H01J 37/08* (2006.01)
*H03B 7/14* (2006.01)
*G06K 7/10* (2006.01)
*G01K 11/26* (2006.01)
*G01S 7/40* (2006.01)
*G01S 13/75* (2006.01)

(56) References Cited

U.S. PATENT DOCUMENTS

| | | | |
|---|---|---|---|
| 6,617,963 B1 * | 9/2003 | Watters | G01D 5/48 340/10.41 |
| 7,009,573 B2 * | 3/2006 | Hornsby | H04B 7/15571 343/727 |
| 7,109,828 B2 * | 9/2006 | Takayama | H03H 9/02661 310/312 |
| 7,441,463 B2 * | 10/2008 | Fallah-Rad | G01M 5/0008 73/773 |
| 7,554,054 B2 * | 6/2009 | Takada | H01J 37/32192 219/121.4 |
| 8,085,156 B2 * | 12/2011 | Schumacher | H04Q 9/00 340/540 |
| 8,348,504 B2 * | 1/2013 | Gregory | F01D 17/085 374/117 |
| 8,930,160 B2 * | 1/2015 | Wall | G01K 7/32 702/130 |
| 8,933,789 B1 * | 1/2015 | Fink | G06Q 10/087 340/10.1 |
| 9,039,280 B2 * | 5/2015 | Peroulis | G01K 7/34 374/183 |
| 9,208,362 B1 * | 12/2015 | Fink | H04W 4/008 |
| 2006/0219705 A1 | 10/2006 | Beier et al. | |
| 2013/0048880 A1 * | 2/2013 | Einziger | H05B 6/64 250/492.1 |
| 2013/0336095 A1 * | 12/2013 | Seppa | G01L 9/0016 367/137 |

OTHER PUBLICATIONS

W. Buff, et al., "Universal Pressure and Temperature Saw Sensor for Wireless Applications", 1997 IEEE Ultrasonics Symposium, Oct. 5, 1997, pp. 359-362, vol. 1, IEEE, New York, NY, USA, XP010271311.

* cited by examiner

SYSTEM FOR INTERROGATING A REMOTELY INTERROGATABLE PASSIVE SENSOR INTEGRATED INTO A METAL CAVITY WITH REDUCED SYSTEM LOSS AND INTERROGATION METHOD

CROSS-REFERENCE TO RELATED APPLICATION

This application claims priority to foreign French patent application No. FR 1353938, filed on Apr. 30, 2013, the disclosure of which is incorporated by reference in its entirety.

FIELD OF THE INVENTION

The field of the invention is that of passive sensors that are remotely interrogatable, and notably temperature sensors, based on surface or bulk acoustic wave resonators that may be generally integrated into any type of cavity, for example an oven, an autoclave, etc.

BACKGROUND

Generally speaking, such sensors are composed of an interrogation unit (itself composed of a transmitting part and a receiving part) and of a temperature sensor using surface acoustic waves, commonly denoted by the acronym SAW. The interrogation system together with the SAW sensor are equipped with an antenna adapted to the operating frequency band (ISM band 433 MHz, 868 MHz, 2.45 GHz, etc.) which allows a wireless interrogation of the sensor to be carried out. FIG. 1 shows schematically such a type of remotely interrogatable sensor. An interrogation/reception unit 10, equipped with an antenna 11, generates an interrogation signal $S_{ERF}$ in the direction of a SAW sensor 20 also equipped with an antenna 21 (low-frequency time-domain pulse of a carrier within the ISM band). The SAW device can advantageously be of the resonator type which allows access to structures of reduced sized.

If the transmission signal $S_{ERF}$ has a frequency sufficiently close to the natural resonance frequency of the SAW resonator, the latter goes into resonance after going through a charging period. A permanent oscillation regime $S_{OREF}$ is then established at the natural resonance frequency of the SAW device. This resonance frequency is proportional to the speed of the surface wave in the resonant cavity which itself depends on the temperature of the resonator.

The sensor re-emits a signal $S_{CREF}$ at its resonance frequency which carries the information associated with the quantity to be measured, for example the temperature.

The transmission/reception unit for the interrogation system detects, outside of the transmission time frame, all or a part of the SAW signal (damped oscillation) and extracts from it the information sought, for example the temperature, via an suitable processing of the signal.

Typically, the resonator can be composed of an interdigitated comb transducer, composed of an alternation of electrodes with widths that are repeated with a certain periodicity, known as acoustic period, deposited onto a piezoelectric substrate which can advantageously be made of quartz. The electrodes, advantageously made of aluminium (formed by a photolithographic process), have a thickness that is small compared with the acoustic period (typically, a few hundreds of nanometres to a few micrometres). For example, for a sensor operating at 433 MHz, the thickness of metal (aluminium) used can be of the order of 1000 Angstroms, where the acoustic period and the electrode width can respectively be around 3.5 µm and 2.5 µm.

One of the ports of the transducer is for example connected to a radio frequency (RF) antenna and the other to ground. The field lines thus created between two electrodes with different polarities give rise to surface acoustic waves in the overlapping region of the electrodes.

The transducer is a bi-directional structure, in other words the energy radiated towards the right and the energy radiated towards the left have the same intensity. By disposing electrodes on either side of the transducer, the former acting as a reflector, a resonator is formed, each reflector partially reflecting the energy transmitted by the transducer.

If the number of reflectors is multiplied, a resonant cavity characterized by a certain resonance frequency is created. This frequency principally depends on the speed of propagation of the waves under the array, the latter mainly depending on the physical state of the substrate, and hence for example sensitive to its temperature. In this case, this is the parameter which is measured by the interrogation system and it is using this measurement that a temperature can be calculated.

It is recalled that the variation of the resonance frequency of a resonator on quartz is determined by the following formula:

$$f(T)=f_0[1+CTF_1(T-T_0)+CTF_2(T-T_0)^2] \quad (1)$$

with $f_0$ the frequency at $T_0$, $T_0$ the reference temperature (25° C. by convention), $CTF_1$ the first order frequency temperature coefficient (ppm/° C.) and $CTF_2$ the second order frequency temperature coefficient (ppb/° $C.^2$).

This law may also be refomulated bringing in a temperature for inversion of the law (1), referred to as turn-over temperature:

$$f(T)=f_{Tt}+f_0 CTF_2(T-T_{turn-over})^2 \quad (2)$$

with $f_{Tt}$ the frequency at the turn-over temperature and $T_{turn-over}$ the turn-over temperature;

These quantities are given by the following equations:

$$T_{turn-over}=T0-CTF_1/2CTF_2$$

$$f_{Tt}=f_0[1-CTF_1^2/4CTF_2] \quad (3)$$

The law of variation of the resonance frequency as a function of temperature is therefore a parabola; the temperature at which the frequency is maximum (summit of the parabola) is known as the turn-over temperature.

It can be particularly advantageous to use two SAW resonators (W. Buff et al., "Universal pressure and temperature SAW sensor for wireless applications" 1997 IEEE Ultra. Symp. Proc.) inclined with respect to one another, as illustrated in FIG. 1. In this case, a first resonator $R_1$, for which the direction of propagation of the surface waves is in a direction X corresponding to one of the crystallographic axes of the crystalline substrate, is coupled to a second resonator $R_2$, inclined by a certain angle α (which can typically be around 20°) with respect to the axis X, and hence using another direction of propagation.

The advantage of such passive temperature sensors resides in the fact that they can be interrogated remotely and hence that it is possible to locate the interrogation and processing unit outside of the heating chamber of the type oven, autoclave, etc., in which the passive sensor is placed, only the transmission/reception antenna, equivalent to the antenna 11 illustrated in FIG. 1, being placed in the said chamber.

Nevertheless, the RF signal becomes a source of multiple reflections of energy within the metal chamber, generating a spatial distribution of the RF energy which is dependent on the size and on the shape of the chamber in which the passive sensor is placed, and which is also dependent on elements seen as obstacles which could also be placed inside of the said chamber.

The spatial distribution of energy then exhibits minima and maxima of power values. If the sensor is positioned near to a minimum value, it may become impossible to interrogate the said sensor remotely. It will nevertheless be sought to optimize the energy efficiency and to optimize the interrogation method.

It may be envisaged to precisely position both the transmission antenna and the sensor within the chamber in order to adopt an optimal configuration taking into account the aforementioned parameters and notably the size and of the shape of the cavity.

For each configuration, it is however necessary to carry out an energy assessment and an appropriate positioning of the said sensor, this problem becoming even more acute in the presence of several sensors.

SUMMARY OF THE INVENTION

For this reason and in order to solve the aforementioned problem, the subject of the present invention is a novel system allowing the remote interrogation of a passive sensor using a number of transmission antennas at least greater than or equal to 2, the said transmission antennas being adjusted in order to generate an energy balance at the passive sensor sufficient to enable an interrogation of the said sensor and to do this irrespective of the configuration of the sensor within the cavity in which it is located.

More precisely, one subject of the present invention is a system comprising:
 a cavity being reflecting for RF waves and comprising at least one acoustic wave sensor exhibiting a resonance frequency band, coupled to one antenna, referred to as sensor antenna, and;
 a device for interrogation/reception of the said sensor, characterized in that the said interrogation/reception device comprises:
  means for transmitting/receiving an RF signal transmitting in an interrogation frequency band comprising the said resonance frequency band of the said sensor;
  at least a first transmission/reception antenna and a second transmission antenna/reception, positioned within the said cavity;
  means for dividing the said signal into at least a first RF signal and a second RF signal, the said first signal being transmitted to the said first transmission/reception antenna and the said second signal being transmitted to the said second transmission/reception antenna;
  means for creating a phase-shift between the said first RF signal and the said second RF signal;
  means for analyzing the power level of the signal received.

Indeed, as will be developed in the description hereinafter, the Applicant has demonstrated that it was possible to spatially displace the energy maxima and minima within the cavity by modulating the phase-shift imposed between the first and the second transmission/reception antenna, by this very technique allowing the energy maxima to be made to coincide with a given position of the sensor in the cavity.

According to one variant of the invention, the said sensor comprises at least one surface acoustic wave resonator.

According to one variant of the invention, the sensor comprises at least two surface acoustic wave resonators.

According to one variant of the invention, the system comprises N sensors positioned within the said cavity, the said cavity comprising at least two transmission/reception antennas, the means for dividing the RF signal being capable of dividing the said RF signal into at least two elementary signals.

According to one variant of the invention, the transmission means comprise means for scanning the RF signal in frequency.

According to one variant of the invention, the means for varying the phase comprise a microcontroller.

According to one variant of the invention, the system comprises:
 automatic means for scanning in phase-shift over a range of values of phase-shift, which can be from 0° to 360°;
 means for recording the power level of the received signal in order to determine an phase-shift that is optimal or that allows a sufficient power level for the received signal;
 automatic means for applying the said phase-shift.

Another subject of the invention is a method for interrogating an acoustic wave sensor integrated into a cavity, the said acoustic wave sensor exhibiting a resonance frequency band and being coupled to one antenna, referred to as sensor antenna, the said cavity comprising at least a first transmission/reception antenna and a second transmission/reception antenna, characterized in that it comprises:
 the transmission of an RF interrogation signal transmitting in an interrogation frequency band comprising the said resonance frequency band of the said sensor;
 the division of the said RF signal into at least a first RF transmission signal and a second RF transmission signal;
 the generation of a phase-shift by digital or analogue methods between the said first RF signal and the said second RF signal in such a manner as to spatially adjust the maxima of electromagnetic energy of the interrogation field within the said cavity by the interference of the said phase-shifted first and second signals;
 the detection of an RF response signal returned by the said sensor.

According to one variant of the invention, the interrogation method comprises a series of successive transmissions of an RF signal scanned in frequency within a frequency band comprising the resonance frequency of the said sensor.

According to one variant of the invention, the generation of the phase-shift between the said first RF signal and the said second RF signal is carried out in an increasing manner until a response signal is detected.

According to one variant of the invention, the interrogation method comprises:
 an initial step for determining the power level of the signal received as a function of the phase-shift imposed over a range of values which can be between 0° and 360°, allowing an optimum phase-shift to be defined;
 the application of the said optimum phase-shift between the said first RF signal and the said second RF signal.

According to one variant of the invention, the sensor comprising at least a first resonator exhibiting at least a first resonance frequency and a second resonator exhibiting at least a second resonance frequency, it comprises:
 a first series of successive transmissions within a first frequency band comprising the said first resonance frequency and the generation of a first phase-shift between the said first RF signal and the said second RF signal;

a second series of successive transmissions within a second frequency band comprising the said second resonance frequency and the generation of a second phase-shift between the said first RF signal and the said second RF signal.

BRIEF DESCRIPTION OF THE DRAWINGS

The invention will be better understood and other advantages will become apparent upon reading the description that follows, presented by way of non-limiting example and thanks to the appended figures, amongst which are.

DETAILED DESCRIPTION

According to the present invention, a passive surface wave sensor that it is desired to interrogate remotely is placed in a cavity, typically made of metal, generating multiple reflections when an interrogation RF signal is sent to interrogate the response of the said sensor, the said sensor occupying a given position within the said cavity.

Figure 1:
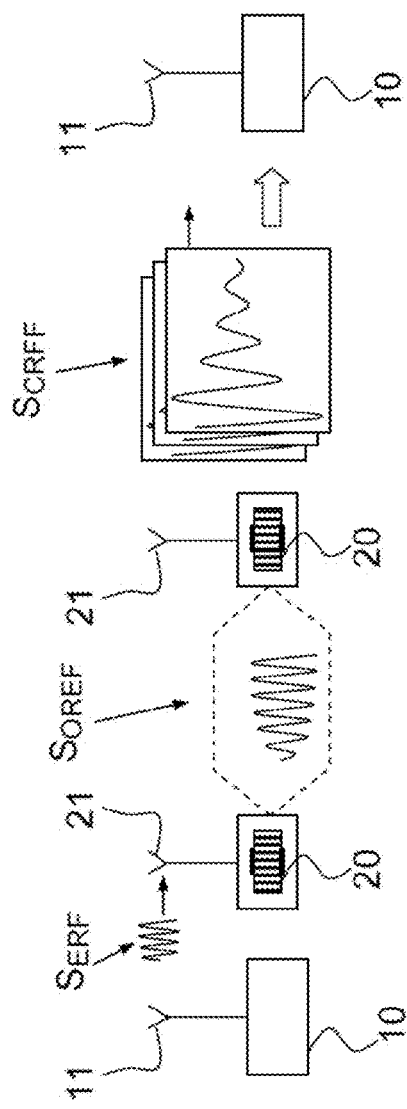
FIG. 1 illustrates a system for interrogation/reception of a passive sensor of the SAW type according to the prior art.
Figure 2:
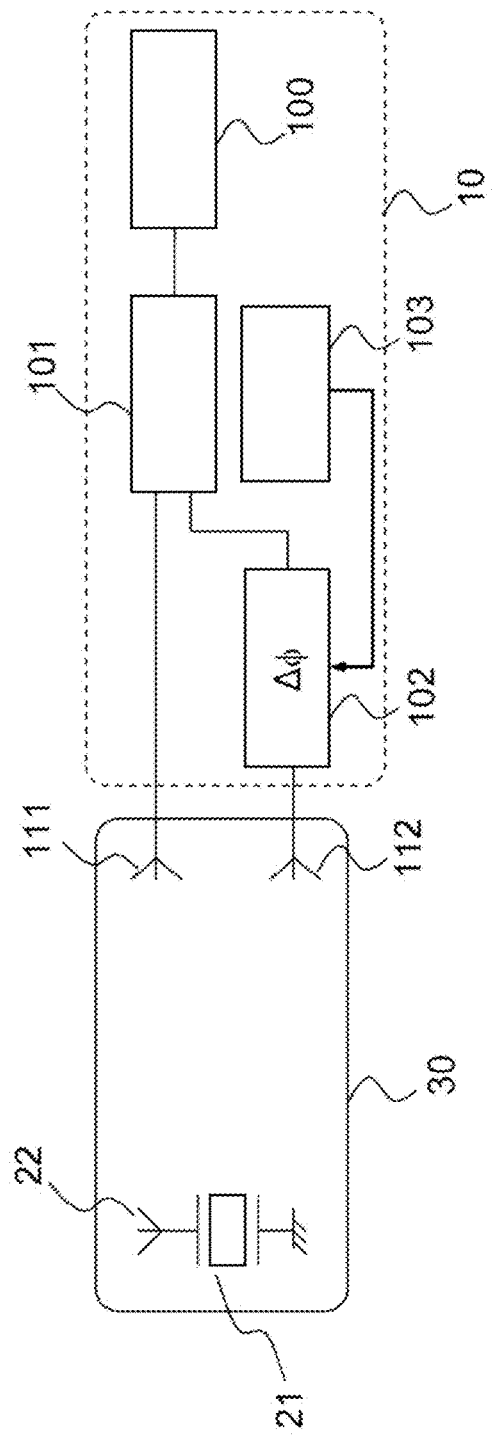
FIG. 2 illustrates a system according to the present invention comprising the interrogation of a passive sensor of the SAW type placed in a cavity equipped with two transmission/reception antennas.

FIG. 2 thus illustrates one example of a cavity 30 in which a SAW sensor 21 is placed, connected, on the one hand, to ground and, on the other, to an antenna referred to as sensor antenna 22.

The device for remote interrogation/reception 10 of the passive sensor 21 comprises means for transmission and detection 100 of an RF signal at a transmission frequency that is varied within a frequency band in which the resonance frequency of the SAW sensor is located.

The RF signal thus generated is divided into two parts, via a divider 101, in such a manner as to create a first RF interrogation signal and a second RF interrogation signal. According to the present invention, a phase-shifter 102, controlled by a unit 103, is provided that is capable of adjusting the phase-shift $\Delta\phi$ between the said first signal and the said second RF interrogation signal.

The first interrogation signal is introduced into the cavity via a first transmission/reception antenna 111, the second interrogation signal being introduced into the cavity via a second transmission/reception antenna 112. The two interrogation signals interfere within the cavity and thus allow the maxima of electromagnetic energy of the interrogation field within the cavity to be spatially adjusted.

More precisely, for this purpose, a phase-shifter 102 is provided that acts on the second interrogation signal and is controlled by a control unit 103 designed to vary the value of the imposed phase-shift.

Figure 3A:
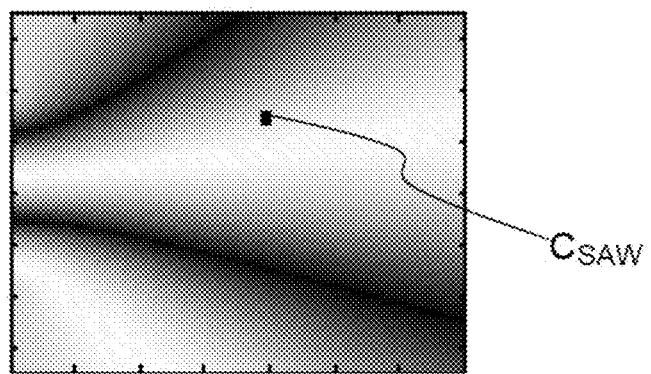
FIGS. 3a, 3b and 3c illustrate the intensity of the electromagnetic field captured by a sensor of the SAW type placed in free space as a function of various phase-shifts imposed between the first RF signal and the second RF signal.
Figure 3B:
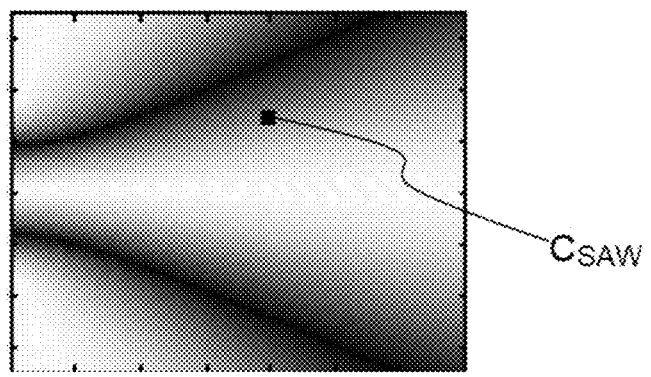
Figure 3C:
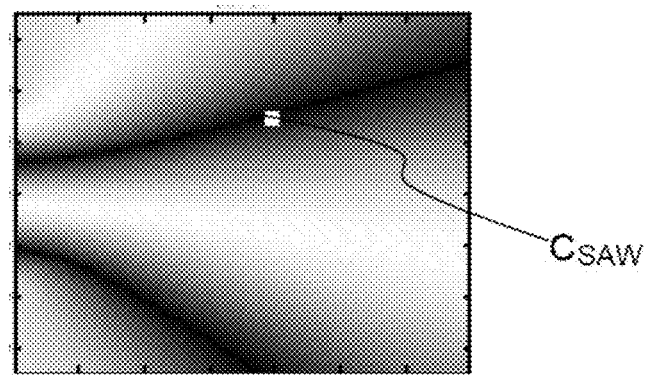

FIGS. 3a, 3b and 3c illustrate the variation of the intensity of the electromagnetic field in free space when the two transmission/reception antennas are separated for example (but not in a limiting way) by one wavelength, the SAW sensor being positioned and localized in the reference frame X,Y by the square: $C_{SAW}$.

More precisely, FIG. 3a relates to a imposed phase-shift of −60°, FIG. 3b relates to an imposed phase-shift of 0° and FIG. 3c relates to an imposed phase-shift of +60°.

The colour black illustrates a minimum of RF energy, whereas the white colour illustrates a maximum of RF energy.

Thus, depending on the exact position of the SAW sensor within this cavity, it appears that a phase-shift of −60° allows the said sensor to be interrogated with a very good energy efficiency, whereas with no phase-shift, this energy efficiency would be much lower, or even very poor with a phase-shift of +60°.

Exemplary Embodiment of a System of the Invention Comprising a Temperature Sensor Placed in a Metal Cavity The temperature sensor of the SAW type is placed in a metal cavity which can be a heating chamber. The said sensor comprises a first resonator and a second resonator respectively exhibiting:
 a first resonance frequency situated within a first band of frequencies: 433-434 MHz;
 a second resonance frequency situated within a second band of frequencies: 434-435 MHz In a first step, the interrogation of the sensor is carried out by a frequency scanning of the 433-434 MHz band; the RF signal received with respect to the RF signal transmitted via the two antennas is recorded.

The interrogation of the sensor is also carried out, in a second step, by a frequency scanning of the 434-435 MHz band; the RF signal received with respect to the RF signal transmitted via the two antennas is recorded.

Figure 4A:
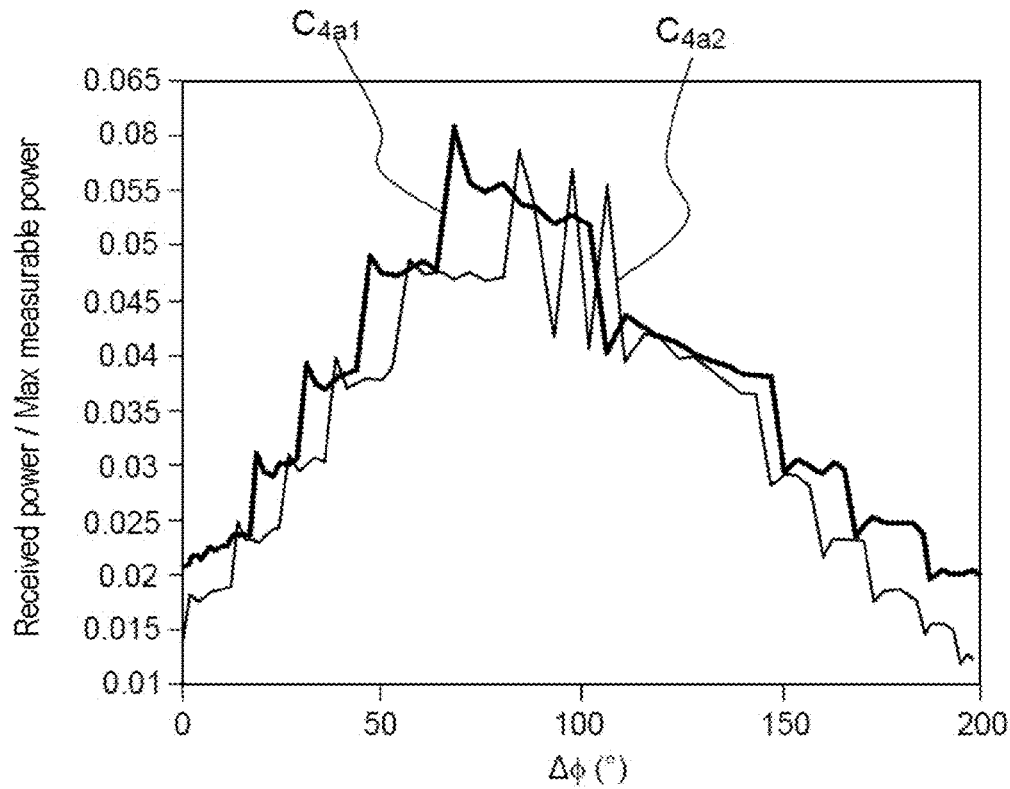
FIGS. 4a and 4b illustrate the ratio of the power detected/the maximum power measurable for various phase-shifts imposed between the first signal and the second signal, in the case of a system comprising a SAW sensor exhibiting two resonance frequencies and placed in two different positions of the cavity.
Figure 4B:
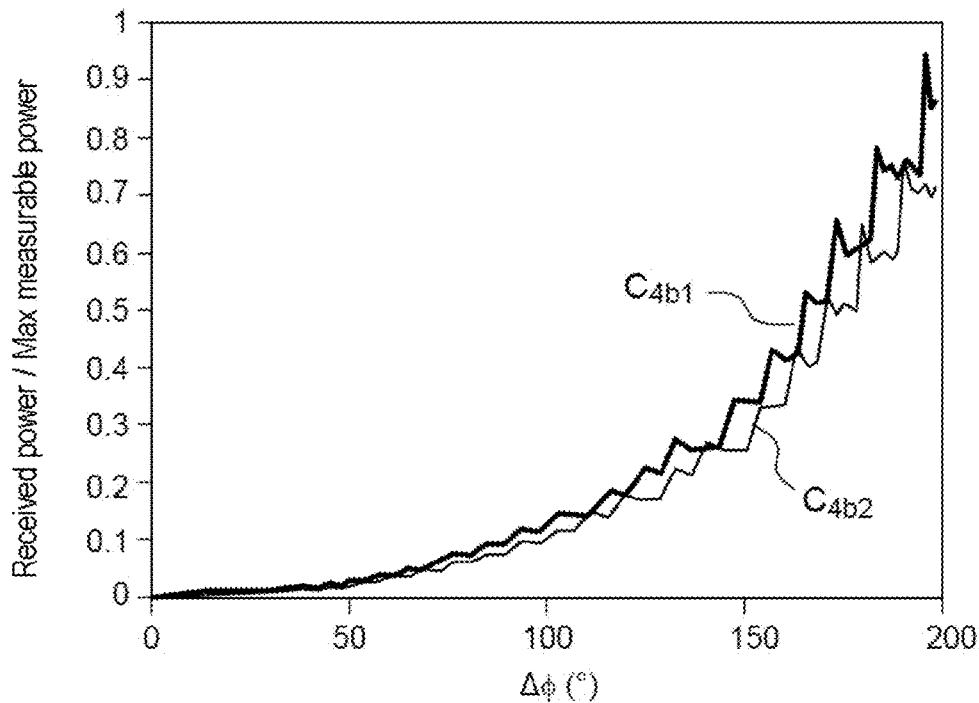

FIGS. 4a and 4b respectively illustrate, for a first position and for a second position of the sensor within the chamber, the time variation of the ratio of the detected signal power/the maximum measurable power illustrating the system loss as a function of the phase-shift imposed between the two interrogation signals during the frequency scanning within the first frequency band and within the second frequency band.

FIG. 4a shows quite a low energy efficiency, but very variable as a function of the imposed phase-shift, going from a value of 0.015 in normalized value to a maximum of 0.065 depending on the frequency. It is thus possible to determine a phase-shift adapted to each resonator as a function of its resonance frequency. The curve $C_{4a1}$ relates to the frequency 433.6 MHz, the curve $C_{4a2}$ relating to the frequency 434.3 MHz.

FIG. 4b shows that, on the other hand, for another position of the sensor, it is possible to obtain an energy efficiency close to the saturation of the detection system also dependent on the phase-shift created between the signals transmitted by the two antennas. The curve $C_{4b1}$ relates to the frequency 433.6 MHz, the curve $C_{4b2}$ relating to the frequency 434.3 MHz.

The system of the invention can operate according to various processes in terms of identification of an appropriate phase-shift.

According to a first variant of the invention, the phase-shift can be manually progressively increased until a value of received signal is obtained that is detectable via the transmission and reception unit, for a given configuration of a sensor positioned within a given cavity, involving renewing the adjustment for each new configuration.

According to a second variant of the invention, the system may advantageously comprise automatic means, performing an automatic increase in the phase until a value of received signal is obtained that is detectable, or performing, in a first step, a complete scanning over the range of phases allowed by the phase-shift system used and recording the received signal, allowing the optimum value of phase-shift to be defined that allows the minimum system loss to be obtained, in order to automatically apply it in a second step.

The present invention has been described within the framework of a sensor and of two transmission/reception antennas. When a chamber comprises several sensors, for example a number N of sensors, it may advantageously be envisaged to equip the cavity comprising the N sensors with N+1 antennas allowing the whole set of suitable phase-shifts to be created, in the case where the sensors are identical in terms of resonance frequency. Indeed, in this case, it is sought to have an additional degree of freedom for optimizing the position of the energy maxima and minima for the various sensors by dividing, in this case, the interrogation RF signal into N+1 elementary signals.

The invention claimed is:

1. A system comprising:
    a cavity being reflecting for RF waves and comprising at least one acoustic wave sensor exhibiting a resonance frequency band, coupled to one antenna, referred to as sensor antenna, and;
    a device for interrogation/reception of the said sensor, characterized in that the said interrogation/reception device comprising:
        means for transmitting/receiving an RF signal transmitting within an interrogation frequency band comprising the said resonance frequency band for the said sensor;
        at least a first transmission/reception antenna and a second transmission antenna/reception, positioned within the said cavity;
        means for dividing the said signal into at least a first RF signal and a second RF signal, the said first signal being transmitted to the said first transmission/reception antenna and the said second signal being transmitted to the said second transmission/reception antenna;
        means for creating a phase-shift between the said first RF signal and the said second RF signal;
        means for analyzing the power level of the received signal.

2. The system according to claim 1, wherein the said sensor comprises at least one surface acoustic wave resonator.

3. A temperature measurement system according to claim 2, wherein the sensor comprises at least two surface acoustic wave resonators.

4. The system according to claim 1, wherein it comprises N sensors positioned within the said cavity, the said cavity comprising at least two transmission/reception antennas, the means for dividing the RF signal being capable of dividing the said RF signal into at least two elementary signals.

5. The system according to claim 1, wherein the transmission means comprise means for scanning the RF signal in frequency.

6. The system according to claim 1, wherein the means for varying the phase comprise a microcontroller.

7. The system according to claim 1, further comprising:
    automatic means for scanning in phase-shift over a range of values of phase-shift, which can be from 0° to 360°;
    means for recording the power level of the received signal in order to determine a phase-shift that is optimal or that allows a sufficient power level for the received signal; and
    automatic means for applying the said phase-shift.

8. A method for interrogating an acoustic wave sensor integrated into a cavity, the said acoustic wave sensor exhibiting a resonance frequency band and being coupled to one antenna, being a sensor antenna, the said cavity comprising at least a first transmission/reception antenna and a second transmission/reception antenna, said method comprising:
    the transmission of an RF interrogation signal transmitting within an interrogation frequency band comprising the said resonance frequency band of the said sensor;
    the division of the said RF signal into at least a first RF transmission signal and a second RF transmission signal;
    the generation of a phase-shift by digital or analogue methods between the said first RF signal and the said second RF signal in such a manner as to spatially adjust the maxima of electromagnetic energy of the interrogation field within the said cavity by the interference of the phase-shifted said first and second signals;
    the detection of an RF response signal returned by the said sensor.

9. The method for interrogating an acoustic wave sensor integrated into a cavity according to claim 8, further comprising a series of successive transmissions of an RF signal scanned in frequency within a frequency band comprising the resonance frequency of the said sensor.

10. The method for interrogating an acoustic wave sensor integrated into a cavity according to claim 8, wherein the generation of the phase-shift between the said first RF signal and the said second RF signal is carried out in an increasing manner until a response signal is detected.

11. The method for interrogating an acoustic wave sensor included within a cavity according to claim 8, further comprising:
    an initial step for determining the power level of the signal as a function of the phase-shift imposed over a range of values, which can be situated between the values 0° and 360°, allowing an optimum phase-shift to be defined;
    the application of the said phase-shift between the said first RF signal and the said second RF signal.

12. The method for interrogating an acoustic wave sensor included within a cavity according to claim 8, wherein the sensor comprises at least one first resonator exhibiting at least a first resonance frequency and a second resonator exhibiting at least a second resonance frequency, and further comprising:
    a first series of successive transmissions within a first frequency band comprising the said first resonance frequency and the generation of a first phase-shift between the said first RF signal and the said second RF signal; and
    a second series of successive transmissions within a second frequency band comprising the said second resonance frequency and the generation of a second phase-shift between the said first RF signal and the said second RF signal.

* * * * *